US011801641B2

(12) United States Patent
Hakkaku et al.

(10) Patent No.: US 11,801,641 B2
(45) Date of Patent: Oct. 31, 2023

(54) SHAPING APPARATUS FOR FORMING A SHAPED OBJECT HAVING AN INTERIOR WITH EXCELLENT COLOR EXPRESSION

(71) Applicant: MIMAKI ENGINEERING CO., LTD., Nagano (JP)

(72) Inventors: Kunio Hakkaku, Nagano (JP); Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 181 days.

(21) Appl. No.: 17/355,149

(22) Filed: Jun. 22, 2021

(65) Prior Publication Data

US 2021/0402703 A1 Dec. 30, 2021

(30) Foreign Application Priority Data

Jun. 24, 2020 (JP) ................. 2020-108936

(51) Int. Cl.
*B29C 64/393* (2017.01)
*B29C 64/386* (2017.01)
*B29C 64/112* (2017.01)
*B33Y 10/00* (2015.01)
*B33Y 50/00* (2015.01)
*B33Y 30/00* (2015.01)

(52) U.S. Cl.
CPC .......... *B29C 64/386* (2017.08); *B29C 64/112* (2017.08); *B33Y 10/00* (2014.12); *B33Y 30/00* (2014.12); *B33Y 50/00* (2014.12); *B29K 2995/003* (2013.01); *B29K 2995/0021* (2013.01)

(58) Field of Classification Search
CPC ................................... B29C 64/393
See application file for complete search history.

(56) References Cited

U.S. PATENT DOCUMENTS

| 2018/0079140 A1* | 3/2018 | Harayama | B29C 64/386 |
| 2018/0126664 A1* | 5/2018 | Okawa | H04N 1/405 |
| 2018/0264723 A1* | 9/2018 | Ochi | B29C 64/209 |
| 2018/0264739 A1* | 9/2018 | Okawa | B29C 64/393 |
| 2019/0043268 A1* | 2/2019 | Harayama | G06T 15/08 |
| 2019/0184627 A1* | 6/2019 | Hakkaku | B29C 64/393 |

(Continued)

FOREIGN PATENT DOCUMENTS

| JP | 6510322 | 5/2019 |
| JP | 2020026092 | 2/2020 |

*Primary Examiner* — Suresh Suryawanshi
(74) *Attorney, Agent, or Firm* — JCIPRNET

(57) ABSTRACT

A shaping apparatus, a shaping method, and a shaping program with which a shaped object can be formed to have the interior with excellent color expression are provided. A 3D printer forms a three-dimensional shaped object having an interior colored, with layer bodies of a light reflective material and a coloring material ejected from an ejection head based on color image data layered. The 3D printer determines arrangement positions of a light reflective material and a coloring material so that the light reflective material is arranged at a predetermined position in each unit volume in a region to be colored inside a shaped object and the coloring material is arranged around the light reflective material based on the color image data. A set position of the unit volume is set to make one surface of one unit volume come into contact with a plurality of other unit volumes.

12 Claims, 13 Drawing Sheets

(56) References Cited

U.S. PATENT DOCUMENTS

2019/0240914 A1* 8/2019 Kunio .................. B29C 64/393
2019/0248074 A1* 8/2019 Nishio .................. B33Y 50/00
2020/0047429 A1* 2/2020 Harayama ............. B33Y 10/00

* cited by examiner

|  | Implementation pattern 1 | Implementation pattern 2 | Implementation pattern 3 | Implementation pattern 4 |
|---|---|---|---|---|
| Light reflective material | Unit volume | Unit volume | Voxel | Voxel |
| Coloring material | Unit volume | Voxel | Unit volume | Voxel |

FIG. 13

SHAPING APPARATUS FOR FORMING A SHAPED OBJECT HAVING AN INTERIOR WITH EXCELLENT COLOR EXPRESSION

CROSS REFERENCE TO RELATED APPLICATIONS

This application claims the priority benefit of Japanese Patent Application No. 2020-108936, filed on Jun. 24, 2020. The entirety of the above-mentioned patent application is hereby incorporated by reference herein and made a part of this specification.

TECHNICAL FIELD

The present disclosure relates to a shaping apparatus, a shaping method, and a shaping program.

DESCRIPTION OF THE BACKGROUND ART

In recent years, a shaping apparatus (3D printer) that ejects ink to form a shaped object has been more actively used. Furthermore, a shaping apparatus with which colors of not only the surface but also the interior of a shaped object can be expressed has been developed, as disclosed in Japanese Patent No. 6510322 (Patent Literature 1) and Japanese Unexamined Patent Publication No. 2020-026092 (Patent Literature 2).

The shaping apparatus disclosed in Japanese Patent No. 6510322 forms a shaped object with a decorative material and a white material mixed for the interior of the shaped object. This shaped object has the color development in its interior, with light that has passed through the decorative material being reflected by the white material therearound, or with the light reflected by the white material passing through the decorative material.

Japanese Unexamined Patent Publication No. 2020-026092 discloses a shaping apparatus that forms a shaped object by arranging a plurality of color cells each set in advance as a coloring unit in a region to be colored that is a region to be colored in the shaped object. The color cell includes a light reflective core that is a portion therein formed by a light reflective material of a white color or the like and a peripheral portion that is a part surrounding the periphery of the light reflective core. In an operation of forming the region to be colored, the shaping apparatus forms the light reflective core in each color cell by ejecting the light reflective material and forms the peripheral portion in each color cell by ejecting a coloring material.

Patent Literature 1: Japanese Patent No. 6510322
Patent Literature 2: Japanese Unexamined Patent Publication No. 2020-026092

SUMMARY

When the white material is used as the light reflective material as disclosed in Japanese Patent No. 6510322 and Japanese Unexamined Patent Publication No. 2020-026092, the color of the white material that is the light reflective material may appear strongly on a cut surface of the shaped object. Specifically, the cut surface may have a white blurred color (what is known as white blur), or the colored part of the cut surface may have a white line. As a result, the color inside the shaped object may fail to be sufficiently expressed.

In view of the above, the present disclosure provides a shaping apparatus, a shaping method, and a shaping program with which a shaped object can be formed to have the interior with excellent color expression.

A shaping apparatus according to an aspect of the present disclosure forms a shaped object which is three-dimensional and has an interior being colored, with layer bodies of a light reflective material and a coloring material ejected from an ejection head based on color image data layered, and includes: a determination device configured to determine an arrangement position of the light reflective material and an arrangement position of the coloring material to arrange the light reflective material at a predetermined position in each unit volume and to arrange the coloring material around the light reflective material based on the color image data, in a region to be colored in the shaped object, wherein a set position of the unit volume is set to make one surface of each unit volume in contact with a plurality of other unit volumes.

With this configuration, the interior of the shaped object can be colored with the coloring material arranged around the light reflective material in the region to be colored inside the shaped object. The light reflective material is disposed at each predetermined position of the unit volume, and the color of the light reflective material is white as an example. When the light reflective material is positioned in a concentrated manner, the color of the light reflective material may appear strongly on the cut surface of the shaped object.

Thus, a set position of the unit volume is set to make one surface of one unit volume come into contact with a plurality of other unit volumes. Thus, the light reflective material is dispersedly arranged instead of being positioned in a concentrated manner, the color of the light reflective material can be prevented from strongly appearing on the cut surface of the shaped object. Therefore, with this configuration, the interior of the shaped object can be formed with excellent color expression.

With the shaping apparatus described above, the determination device may be configured to arrange the coloring material in the region to be colored based on the color image data, irrespective of the set position of the unit volume or the arrangement position of the light reflective material. With this configuration, the arrangement position of the coloring material is not limited by the unit volume, whereby the color of the shaped object based on the color image data can be more smoothly expressed.

A shaping apparatus according to an aspect of the present disclosure forms a shaped object which is three-dimensional and has an interior being colored, with layer bodies of a light reflective material and a coloring material ejected from an ejection head based on color image data layered, and includes: a determination device configured to determine an arrangement position of the coloring material, in a region to be colored in the shaped object, in a minimum constituent unit of the shaped objected based on the color image data, and determine an arrangement position of the light reflective material to arrange the light reflective material in a dispersed manner in the region to be colored.

With this configuration, the arrangement position of the coloring material inside the shaped object is determined based on the minimum constituent unit of the shaped object. Thus, the color of the shaped object based on the color image data can be more smoothly expressed. Furthermore, the light reflective material is dispersedly arranged in the region to be colored, whereby the color of the light reflective material is prevented from strongly appearing on the cut surface of the shaped object. Therefore, with this configuration, the interior of the shaped object can be formed with excellent color expression.

With the shaping apparatus described above, the region to be colored may include the light reflective material at a predetermined ratio, and the light reflective material is arranged irregularly and in the dispersed manner. With this configuration, the color of the light reflective material can be prevented from strongly appearing on the cut surface of the shaped object.

In the shaping apparatus, when a color in the shaped object indicated by the color image data is a color with a higher brightness or a lower saturation than a peripheral color, a transparent (clear) material may be arranged in an arranged region of the coloring material. With such a configuration, a bright color or a light color can be expressed while maintaining the color tone, and the shape of the shaped object can be maintained.

With the shaping apparatus described above, a region of a predetermined thickness in a normal direction from a surface toward the interior of the shaped object may be set to be a no light reflective material arranged region in which the light reflective material is not arranged, and the determination device may be configured to arrange the coloring material in the no light reflective material arranged region based on the color image data. With this configuration, the color of the light reflective material does not appear on the surface of the shaped object, whereby color expression with excellent contrast with respect to the surface of the shaped object can be achieved.

In the shaping apparatus described above, the determination device may be configured to arrange a relatively large amount of the light reflective material in an inner region of the shaped object in contact with the no light reflective material arranged region. With this configuration, color expression with excellent contrast with respect to the surface of the shaped object can be achieved.

With the shaping apparatus described above, the light reflective material is preferably a white material that reflects visible light, and is preferably a material containing an inorganic pigment such as titanium oxide for example.

With the shaping apparatus described above, the arrangement position of the coloring material is determined with a halftone process performed on the color image data.

In the shaping apparatus, the color of the coloring material may be colored by a subtractive color mixing method using at least yellow, magenta, and cyan.

In the shaping apparatus, the light reflective material and the coloring material may be ultraviolet-curable resin.

A shaping method of forming a shaped object which is three-dimensional and has an interior being colored, with layer bodies of a light reflective material and a coloring material ejected from an ejection head based on color image data layered, by using the shaping apparatus according to an aspect of the present disclosure, includes: determining an arrangement position of the light reflective material and an arrangement position of the coloring material to arrange the light reflective material at a predetermined position in each unit volume and to arrange the coloring material around the light reflective material based on the color image data, in a region to be colored in the shaped object, wherein a set position of the unit volume is set to make one surface of each unit volume in contact with a plurality of other unit volumes.

A non-transitory computer readable medium stored with a shaping program according to an aspect of the present disclosure causing a computer of the shaping apparatus described above that forms a shaped object which is three-dimensional and has an interior being colored, with layer bodies of a light reflective material and a coloring material ejected from an ejection head based on color image data layered, to function as: a determination device that determines an arrangement position of the light reflective material and an arrangement position of the coloring material to arrange the light reflective material at a predetermined position in each unit volume and to arrange the coloring material around the light reflective material based on the color image data, in a region to be colored in the shaped object, wherein a set position of the unit volume is set to make one surface of each unit volume in contact with a plurality of other unit volumes.

A shaping method of forming a shaped object which is three-dimensional and has an interior being colored, with layer bodies of a light reflective material and a coloring material ejected from an ejection head based on color image data layered, by using the shaping apparatus according to an aspect of the present disclosure, includes: determining an arrangement position of the coloring material, in a region to be colored in the shaped object, in a minimum constituent unit of the shaped objected based on the color image data, and determining an arrangement position of the light reflective material to arrange the light reflective material in a dispersed manner in the region to be colored.

A non-transitory computer readable medium stored with a shaping program according to an aspect of the present disclosure causing a computer of the shaping apparatus described above that forms a shaped object which is three-dimensional and has an interior being colored, with layer bodies of a light reflective material and a coloring material ejected from an ejection head based on color image data layered, to function as: a determination device that determines an arrangement position of the coloring material, in a region to be colored in the shaped object, in a minimum constituent unit of the shaped objected based on the color image data, and determines an arrangement position of the light reflective material to arrange the light reflective material in a dispersed manner in the region to be colored.

A shaping apparatus according to an aspect of the present disclosure forms a shaped object which is three-dimensional and has an interior being colored, with layer bodies of a light reflective material and a coloring material ejected from an ejection head based on color image data layered, and includes: a determination device configured to determine an arrangement position of the light reflective material and an arrangement position of the coloring material to arrange the light reflective material at a predetermined position in each unit volume and to arrange the coloring material around the light reflective material based on the color image data, in a region to be colored in the shaped object, wherein the determination device is configured to arrange the coloring material in the region to be colored, irrespective of the set position of the unit volume or the arrangement position of the light reflective material.

EFFECT OF THE INVENTION

With the present disclosure, a shaped object can be formed to have the interior with excellent color expression.

BRIEF DESCRIPTION OF THE DRAWINGS

FIG. 13 is a schematic view illustrating relationship between arrangement positions of a light reflective material and a coloring material according to the embodiments of the present disclosure.

DETAILED DESCRIPTION OF EMBODIMENTS

A shaping apparatus, a shaping method, and a shaping program according to embodiments of the present disclosure will be described below with reference to the drawings.

First Embodiment

Figure 1:
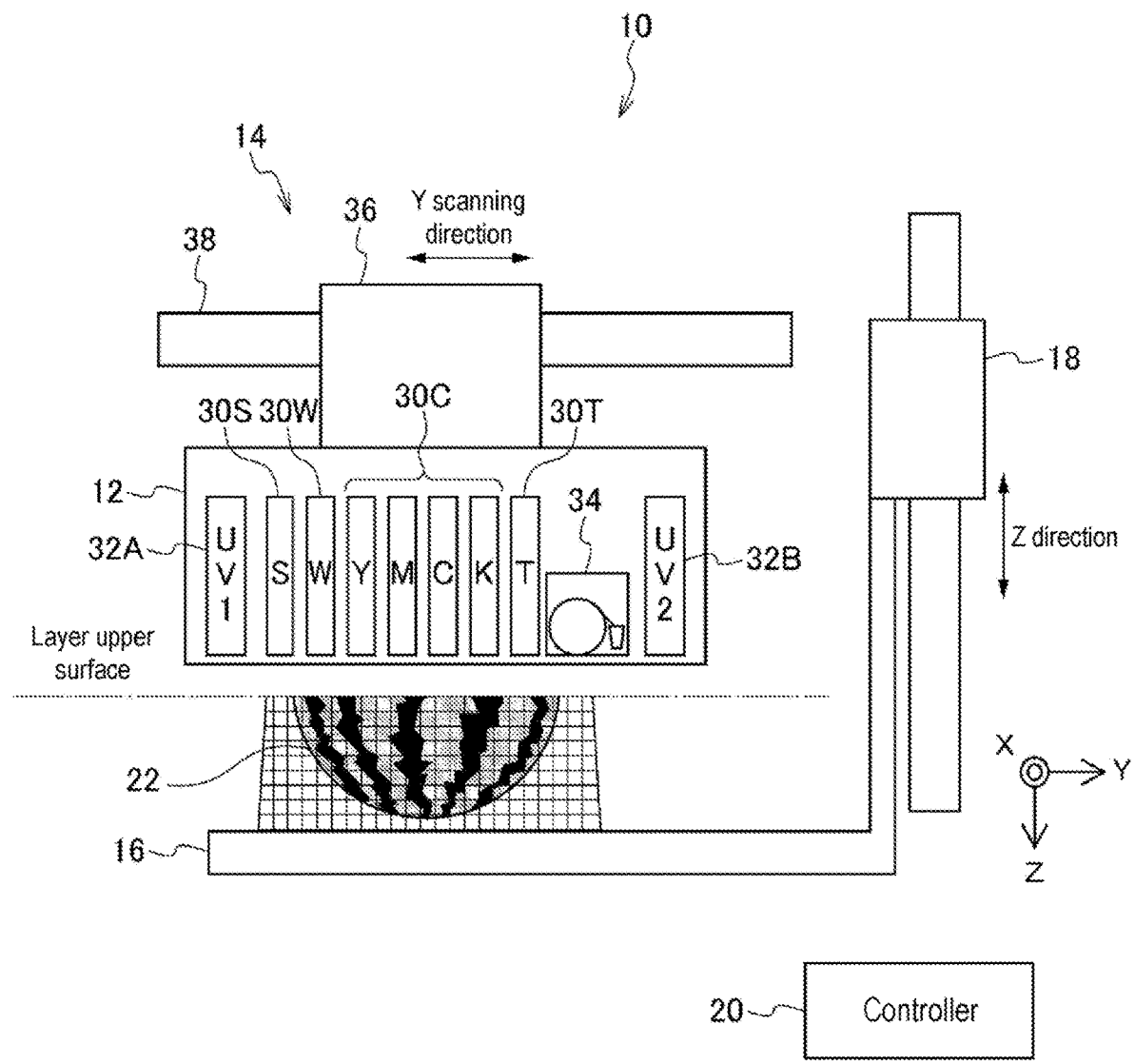
FIG. 1 is a schematic configuration diagram of a 3D printer according to a first embodiment of the present disclosure.

FIG. 1 is a schematic configuration diagram of a 3D printer 10 of the present embodiment. The 3D printer 10 of the present embodiment is a shaping apparatus that uses an inkjet method, includes a recording unit 12, a scanning driving portion 14, a shaping table 16, a layering direction moving portion 18, and a controller 20, and forms a three-dimensional shaped object 22 by ejecting ink droplets, which are materials, from the recording unit 12 and layering the solidified ink droplets.

As will be described in detail later, the 3D printer 10 according to the present embodiment ejects a light reflective material and a coloring material from the recording unit 12 (inkjet head), based on color image data, to layer bodies, to form a three-dimensional shaped object 22 having a surface and the interior colored. The light reflective material is a white material that reflects visible light, and is preferably a material containing an inorganic pigment such as titanium oxide for example.

The recording unit 12 ejects the material of the shaped object 22 while reciprocating in a left and right direction of the drawing sheet of FIG. 1 along a Y scanning direction, which is the main scanning direction. As a result, layers forming the shaped object 22 are layered one by one, whereby the shaped object 22 is formed on the shaping table 16. More specifically, the recording unit 12 includes: an inkjet head 30 (30S, 30W, 30C, and 30T) that ejects toward the shaping table 16 ink droplets including various inks to be the material of the shaped object 22 and a support material that supports the outer shape of the shaped object 22; a light source 32A and a light source 32B that irradiate a layer formed by the ink droplets that landed on the shaping table 16 with light of a predetermined wavelength (for example, ultraviolet light) to cure the ink droplets; and a flattening roller 34 that flattens a layered upper surface formed during the shaping of the shaped object 22. When the light source 32A and the light source 32B are not distinguished from each other, they are simply referred to as a light source 32.

The inkjet head 30 of the present embodiment includes a support material head 30S that ejects a support material (S), a white ink head 30W that ejects a white ink (W) containing a white pigment that is a light reflective material, a color ink head 30C that ejects a color ink containing a coloring pigment, and a clear ink head 30T that ejects a clear ink (T) that contains no pigment to be transparent. For example, the color ink head 30C of the present embodiment includes ejection heads that respectively eject cyan (C), magenta (M), yellow (Y), and black (K) inks. Thus, the shaped object 22 formed by the 3D printer 10 of the present embodiment is colored by a subtractive color mixing method. All the inks in the present embodiment are ultraviolet-curable resin, but only the support ink is further water soluble to be dissolvable and removable by rinsing after the shaping operation.

Arrangement positions of the components of the recording unit 12 will be described with reference to the Y scanning direction. The light source 32A is arranged on the left side of the inkjet head 30, whereas the light source 32B is arranged on the right side of the inkjet head 30. The flattening roller 34 is disposed adjacent to the clear ink head 30T, and is disposed between the light source 32B and the inkjet head 30.

The scanning driving portion 14 is a driver that moves the recording unit 12 relative to the shaped object 22 (scanning operation), and causes the recording unit 12 to perform a main scanning operation (Y scanning) and a sub scanning operation (X scanning) as the scanning operation.

The scanning driving portion 14 includes a carriage 36 and a guide rail 38. The carriage 36 is a holding portion that holds the recording unit 12 so as to face the shaping table 16. Specifically, the carriage 36 holds the recording unit 12 so that a discharging direction of the ink droplet can be a direction toward the shaping table 16. During the main scanning operation, the carriage 36 moves along the guide rail 38 while holding the recording unit 12. The guide rail 38 is a rail-shaped member that guides the movement of the carriage 36, and moves the carriage 36 in response to an instruction from the controller 20 during the main scanning operation.

The layering direction moving portion 18 enables the distance between the recording unit 12 and the shaping table 16 to be changed. Specifically, the upper surface of the shaping table 16 is movable in the vertical direction (Z direction in FIG. 1) by the layering direction moving portion 18. Thus, the distance (gap) between the layer upper surface of the shaped object 22 being formed and the recording unit 12 is appropriately adjusted.

The movement of the recording unit 12 in the main scanning operation may be any relative movement with respect to the shaped object 22. For example, the shaped object 22 may be moved by moving the shaping table 16 with the position of the recording unit 12 fixed. Furthermore, the relative vertical movement between the recording unit 12 and the shaping table 16 in the Z direction may be implemented, for example, by moving the recording unit 12 in the Z direction.

The controller 20 controls the 3D printer 10, and causes the 3D printer 10 to execute shaping processing, by controlling each part of the 3D printer 10 based on slice data (shaping data and color image data) indicating the cross section of the shaped object 22.

The slice data is generated based on of a shaping job such as 3D model data, is data corresponding to a cross section of each position of the shaped object 22, and is generated, for example, by another information processing apparatus connected to the 3D printer 10. The 3D model data is data indicating the shape, the surface color, and the like of the shaped object 22, and is generated based on, for example, 3D CAD data, data of an appearance obtained by capturing an image of the shaped object 22 to be produced, and the like.

Next, an overview of the shaping processing by the 3D printer 10 of the present embodiment will be described.

First of all, the 3D printer 10 ejects ink based on the shaping data and the color image data while performing the Y scanning with the recording unit 12 moving in the right direction relative to the shaped object 22 (first process). At this time, the flattening roller 34 has moved (by a moving mechanism not illustrated) in the upward direction of the Z axis, to have the lower end positioned so as not to be in contact with the upper surface of the shaped object 22.

In the present embodiment, the thickness of the layer formed by performing the Y scanning once is about 20 μm. Furthermore, as a part of the support layer (S) for the shaped portion, one or more types of ink of any one of color ink (Y, M, C, K), white ink, and clear (transparent) ink may be included in addition to the support material ink.

Next, as a second process, the 3D printer 10 ejects ink based on the slice data while performing the Y scanning with the recording unit 12 moving in the left direction relative to the shaped object 22. At this time, the flattening roller 34 has moved in the downward direction of the Z axis to have the lower end positioned to be in contact with the upper surface of the shaped object 22, and rotates in the clockwise direction. As a result, the flattening roller 34, for example, flattens the upper surface of the layer having a thickness of approximately 40 μm as a result of ejection while the Y scanning operations are performed twice (single reciprocation on the left and right direction), by scraping the layer upper surface yet to be cured for approximately 8 μm. Thus, the resultant thickness of the layer is approximately 32 μm. The light source 32B is turned ON to cure the ink of the flattened uppermost layer of the shaped object 22 formed by the layers as a result of the ejection by the recording unit 12.

Next, when the dimension of the shaped object 22 in the X direction is larger than the length of the nozzle row in the X direction of the ink heads, the recording unit 12 or the shaped object 22 is moved in the X direction by a predetermined amount according to the dimension in the X direction of the shaped object 22 (third process) after the first process and the second process have been completed.

By ejecting the ink according to the dimensions in the X direction and the Y direction of the shaped object 22 through repetition of the first process to the third process, one layer of the shaped object 22 is completed.

Next, as a fourth process, the 3D printer 10 lowers the height of the shaping table 16 by a predetermined distance in the Z direction. The distance by which the height of the shaping table 16 is lowered is, for example, 32 μm. This value of 32 μm is determined assuming the following condition. Specifically, the thickness of the layer formed by performing Y scanning once is assumed to be 20 μm, and the thickness of 40 μm of the layer as a result of layering the two layers with the Y scanning performed twice is assumed to include a variation in thickness of 8 μm (irregularities on the surface). The position of the lower end of the flattening roller 34 in the Z direction when flattening the layer is always the same. Thus, lowering the height of the shaping table 16 always results in flattening for achieving the layer thickness of 32 μm.

The 3D printer 10 repeats the first process to the fourth process until the layering corresponding to the dimension in the Z direction of the shaped object 22 is completed.

Figure 2A:
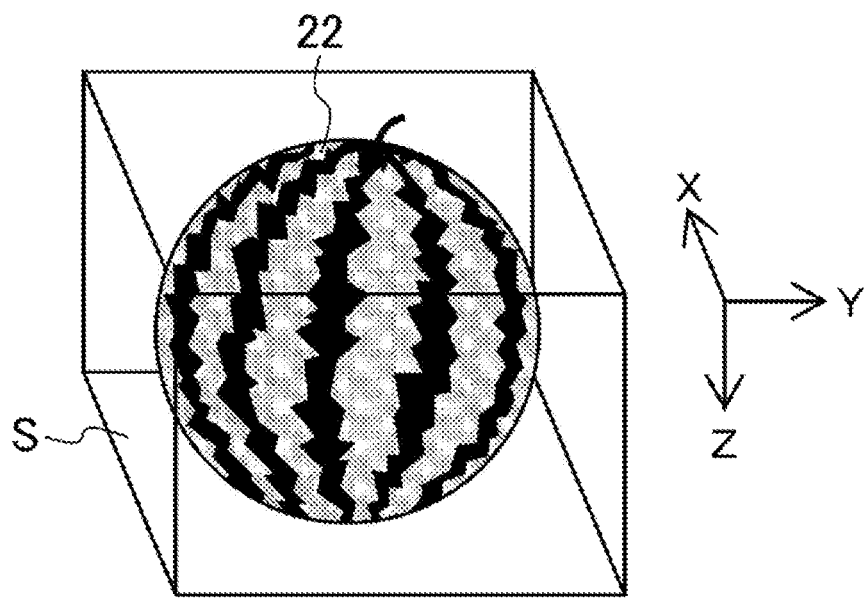
FIGS. 2A and 2B are schematic views of a shaped object formed by the 3D printer of the first embodiment of the present disclosure.
Figure 2B:
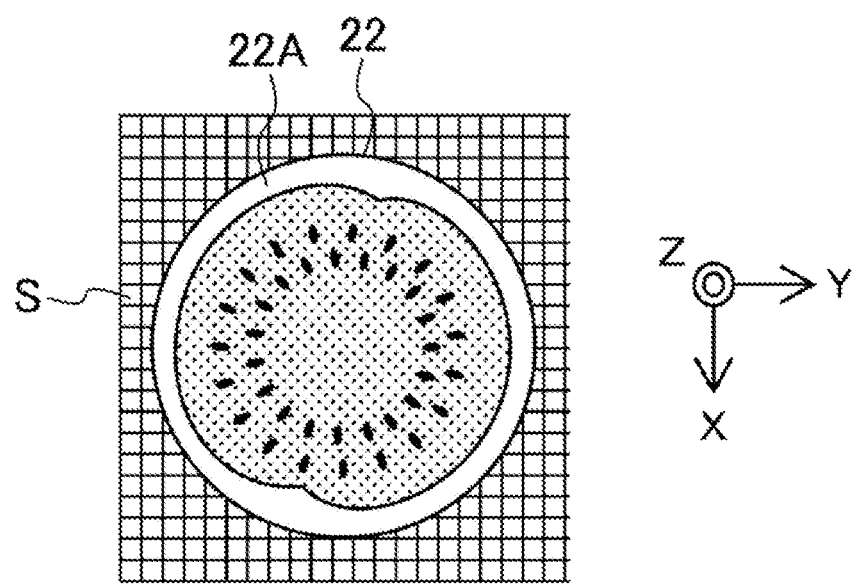

FIGS. 2A and 2B are schematic diagrams illustrating an example of the shaped object 22 formed by the 3D printer 10 of the present embodiment. As described above, the 3D printer 10 of the present embodiment colors not only the surface of the shaped object 22 illustrated in FIG. 2A but also colors the interior of the shaped object 22 as illustrated in FIG. 2B. Thus, when the shaped object 22 is cut, a colored cut surface 22A appears. In FIGS. 2A and 2B, the support layer S exists around the shaped object 22. The support layer S is dissolved by water as described above.

The 3D printer 10 of the present embodiment uses the white ink as the light reflective material in the shaped object 22, with the color ink mixed in the white ink. Thus, the light that has passed through the color ink is reflected by the white ink therearound, or the light reflected by the white ink passes through the color ink, whereby color development is achieved by the subtractive color mixing method.

Unfortunately, when the light reflective material positioned in a concentrated manner, the color of the white ink might strongly appear on the cut surface 22A of the shaped object 22. Specifically, the cut surface 22A may have a white blurred color (what is known as white blur), or the colored part of the cut surface 22A may have a white line. As a result, the color expression inside the shaped object 22 may be insufficient.

Figure 3:
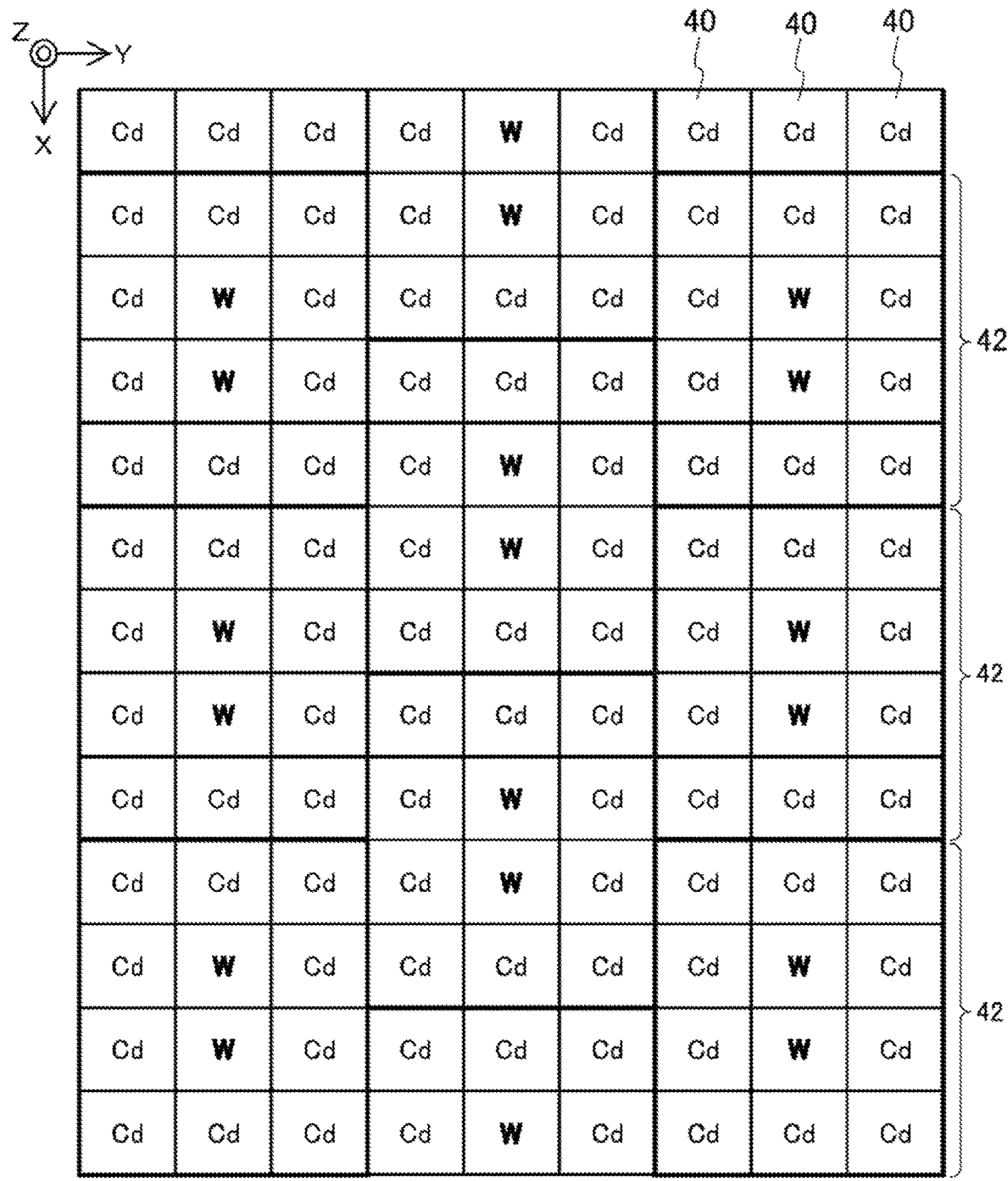
FIG. 3 is a schematic view illustrating arrangement positions of a light reflective material and a coloring material according to the first embodiment of the present disclosure.

Therefore, as illustrated in FIG. 3, the 3D printer 10 of the present embodiment arranges a light reflective material W at a predetermined position per unit volume 42 in the region to be colored in the cut surface 22A of FIG. 2B of one layer of the shaped object 22, that is, the layered upper surface of FIG. 1, and arranges a coloring material Cd around the light reflective material W based on the color image data. The set position of the unit volume 42 is set such that another unit volume 42 in contact with one surface of one unit volume 42 includes a plurality of unit volumes 42. The surface of the unit volume 42 in contact with a plurality of other unit volumes 42 may not be all the surfaces, and may be one or more surfaces as described later in detail. In the following description, the white ink used as the light reflective material W is also referred to as a white material.

In FIG. 3, each of the light reflective material W and the coloring material Cd is a voxel 40, which is a minimum constituent unit of the shaped object 22 and can be regarded as an ink droplet ejected from the inkjet head 30 and cured. The unit volume 42 is a region including a plurality of the voxels 40. The unit volume 42 of the present embodiment includes 12 (3×4) voxels 40 as an example, but the unit volume 42 may include any two or more voxels 40, and preferably includes eight or more voxels 40. In FIG. 3, the unit volume 42 is expressed in an XY plane. Alternatively, the unit volume 42 may have a three-dimensional shape having a size of two or more layers in the Z direction, or may not necessarily have a rectangular shape. Also in the cross sectional views of FIG. 3 and after, XYZ directions are illustrated for convenience. However, this should not be construed in a limiting sense, and the three directions may be interchanged in any way.

In the example of FIG. 3, two light reflective materials W are arranged in the X direction in a center portion of the unit volume 42, and the coloring materials Cd are arranged around the two light reflective materials W. The arrangement positions and the arrangement direction of the light reflective material W are examples. The number of the light reflective materials W included in the unit volume 42 is not limited to two. One or more light reflective materials W may be arranged without completely filling the unit volume 42. The number of the light reflective materials W may vary among the unit volumes 42. In addition, when the unit volume 42 includes two or more layers in the Z direction, the light reflective material W may also include two or more layers, or may include only one layer. Furthermore, a plurality of the light reflective materials W may be dispersedly arranged in the unit volume 42, and the dispersed arrangement of the light reflective materials W (orientation of arrangement of the light reflective materials W) may vary among the unit volumes 42.

In the example of FIG. 3, the unit volume 42 has two opposing side surfaces, in the X direction which is the predetermined, each in contact with two other unit volumes 42, and thus both side surfaces are in contact with four other unit volumes 42 in total. In this manner, the unit volumes 42 of the present embodiment are set to be arranged while being offset from each other in the predetermined direction. In other words, the unit volumes 42 and the other unit volumes 42 in contact with each other in the predetermined direction are alternately arranged. Note that the unit volumes 42 and the other unit volumes 42 in contact therewith may be set to be alternately arranged also in the Z direction.

As described above, the 3D printer 10 of the present embodiment arranges the coloring materials Cd around the light reflective materials W in each unit volume 42 in the region to be colored inside the shaped object 22, with the unit volume 42 set to have both side surfaces each in contact with a plurality of other unit volumes 42. Thus, since the light reflective material W is dispersedly (discretely) arranged instead of being positioned in a concentrated manner, the color of the light reflective material W can be prevented from strongly appearing on the cut surface 22A of the shaped object 22. Thus, the 3D printer 10 of the present embodiment can form the interior of the shaped object 22 with excellent color expression.

In the present embodiment, the coloring material Cd is arranged based on the color image data without being limited to the setting position of the unit volume 42 in the region to be colored inside the shaped object 22. The arrangement of the coloring materials Cd of the present embodiment will be described with reference to FIGS. 4 and 5.

Figure 4:
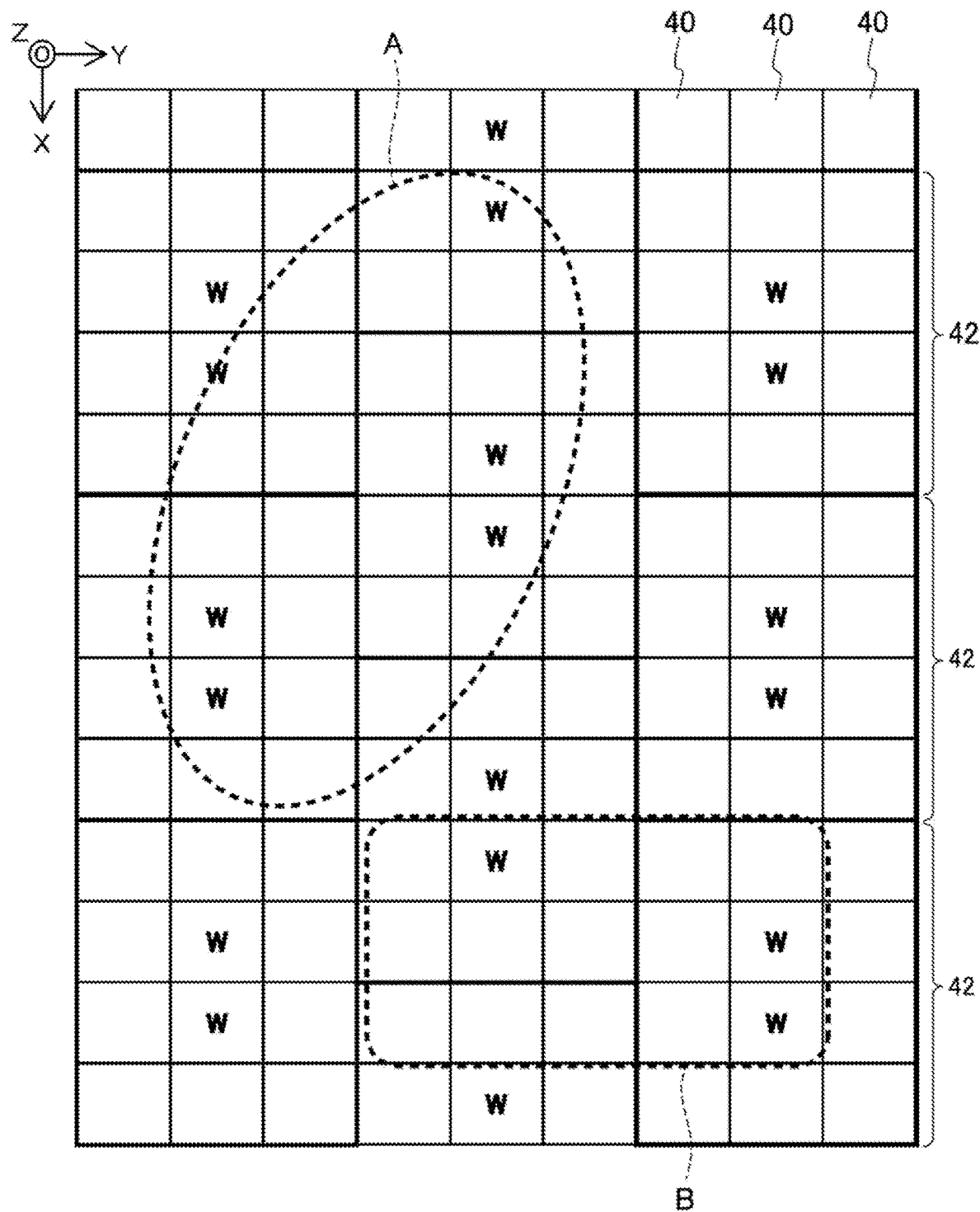
FIG. 4 is a schematic view illustrating arrangement positions of the light reflective material and the coloring material in a case where the arrangement position of the coloring material is not limited by a unit volume, according to the first embodiment of the present disclosure.
Figure 5:
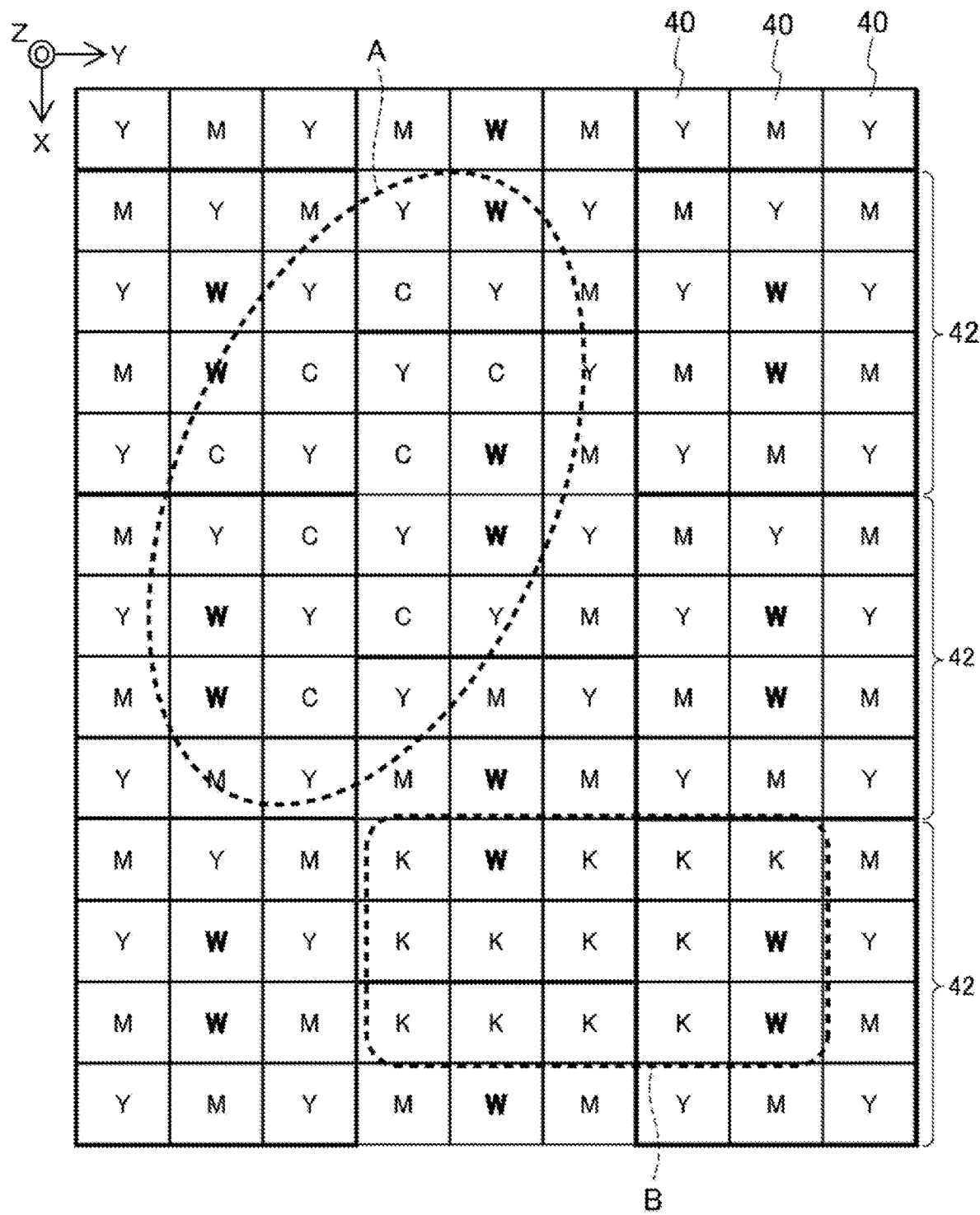
FIG. 5 is a schematic view illustrating an arrangement position of the coloring material as a result of a subtractive color mixing method according to the first embodiment of the present disclosure.

FIG. 4 is a schematic diagram illustrating the arrangement positions of the light reflective materials W and the coloring materials Cd when the arrangement positions of the coloring materials Cd of the present embodiment is not limited by the unit volume 42. FIG. 5 is a schematic view illustrating the arrangement positions of the coloring materials Cd as a result of the subtractive color mixing method of the present embodiment.

In the example of FIG. 4, the elliptical broken line region A is the region to be colored in green (G), the rectangular broken line region B is the region to be colored in black, and the remaining region is the region to be colored in red (R). As indicated by this region to be colored, the resolution of the color image data is not limited by the unit volume 42, and the voxel 40 is the minimum unit of the color image data. Note that the arrangement positions of the light reflective material W are determined in advance.

As illustrated in FIG. 5, as the coloring materials Cd, yellow (Y) and cyan (C) are arranged to surround the light reflective materials W in the broken line region A, and thus the region to be colored in green is obtained. In the broken line region B, black (K) is arranged to surround the light reflective materials W, and thus the region to be colored in black is obtained. In the remaining region, yellow (Y) and magenta (M) are arranged to surround the light reflective materials W, and thus the region to be colored in red is obtained.

As described above, the 3D printer 10 of the present embodiment is not limited to the size and arrangement of the unit volumes 42 in the three-dimensional direction and the arrangement of the light reflective materials W. In other words, the coloring materials Cd are arranged based on the color image data regardless of the unit volume 42. Thus, the 3D printer 10 can express the color of the shaped object 22 more smoothly based on the color image data.

The arrangement positions of the coloring materials Cd are determined by performing a halftone process on the color image data. The halftone process is a process of converting color image data into binary pixels in accordance with the density, so that the gradation of the color image can be reproduced by the recording unit 12. Specifically, in the halftone process, the image data on each layer of the color image data is converted into pixels, and for example, the input RGB image data is converted into CMYK image data corresponding to the color of the coloring material Cd. The halftone process is, for example, a dither method, an error diffusion method, a frequency modulation (FM) screen method, or the like, and is not particularly limited.

Next, the arrangement of the coloring materials Cd in a case where the color image data represents a bright color or a light color will be described.

In a case where the color image data represents a bright color or a light color, for example, an empty region (i.e., empty voxel) may be provided in which the coloring material Cd is not arranged in the arrangement region of the coloring materials Cd. However, when the empty region is provided inside the shaped object 22, the shape of the shaped object 22 may fail to be maintained.

When the color in the shaped object 22 indicated by the color image data is, for example, a bright color having relatively higher brightness than the peripheral color, or for example, a light color or transparent with relatively lower saturation than the peripheral color, an empty region is formed to ruin the shape of the shaped object due to insufficient amount of coloring material Cd. Thus, the 3D printer 10 of the present embodiment provides (supplements) the empty region without the coloring material Cd with a clear ink which is a transparent material. Thus, the transparent material provided in the empty region described above is used for expressing the color indicated by the color image data, and also as the supplementary material for maintaining the shape of the shaped object 22. With such a configuration, a bright color or a light color can be expressed while maintaining the color tone, and the shape of the shaped object 22 can be maintained.

As the supplementary material, a white material may be used, but this results in low visibility of the color of the layer behind (on the inner side of the shaped object 22) the white material since the white material has a strong shielding power. For this reason, which of the transparent material and the white material is used as the supplementary material is appropriately selected according to the color to be expressed.

Figure 6:
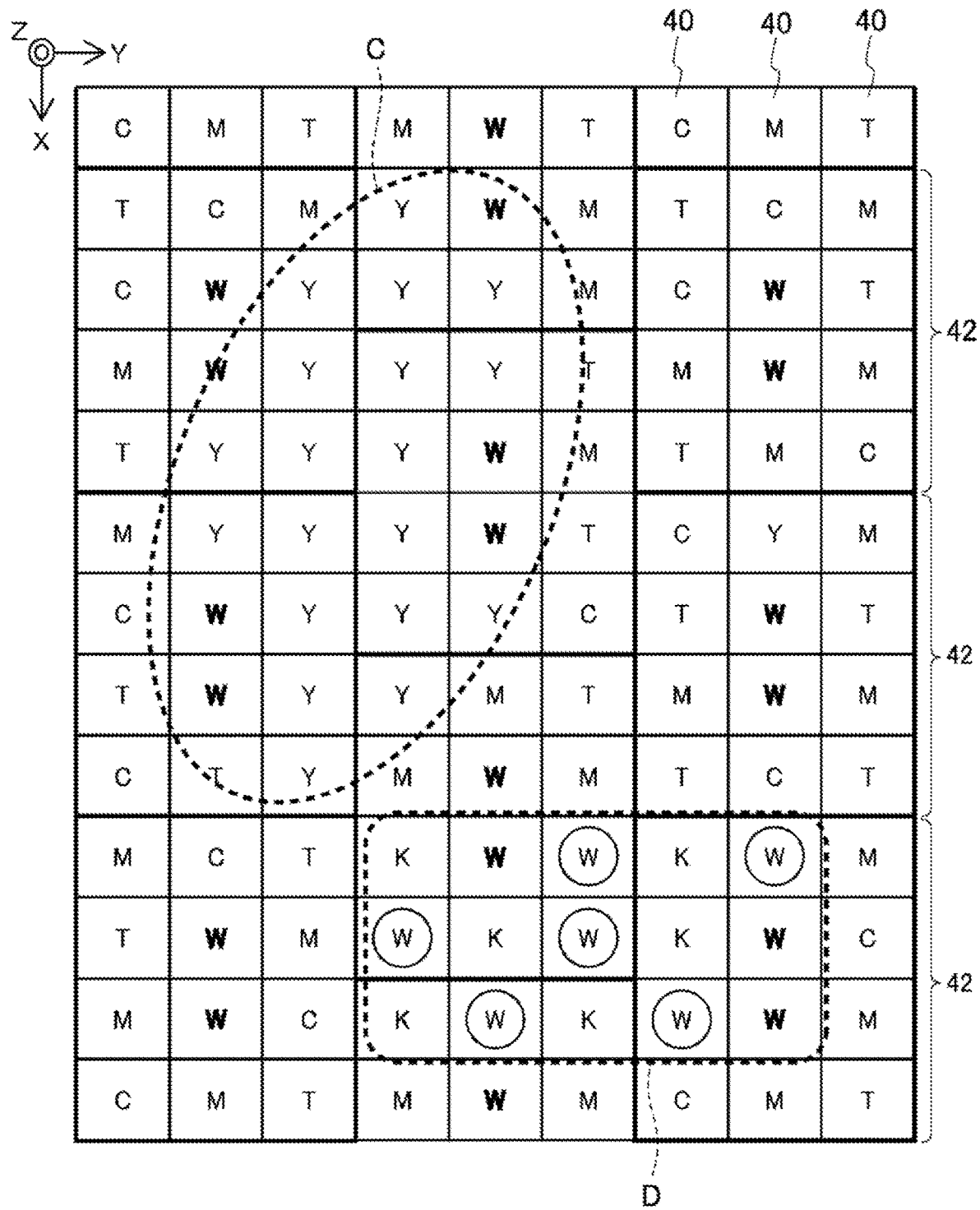
FIG. 6 is a schematic view illustrating an arrangement of the coloring material, a clear ink, and a white ink in a case where a bright color is expressed according to the first embodiment of the present disclosure.

FIG. 6 is a schematic diagram illustrating an arrangement of the coloring materials Cd as well as clear and white as the supplementary material for expressing a bright color or a light color. In FIG. 6, "W" as the light reflective material W is circled to be distinguished from the white material for the supplementary purpose. In the example of FIG. 6, yellow (Y) is arranged as the coloring material Cd in the broken line region C, and thus a yellow region is obtained. In a broken line region D, black (K) and white (W) are arranged to form a light black region, that is, a gray region. In the remaining region, cyan (C), magenta (M), and clear (T) are arranged to form a bright blue region. To express gray as a black light color, clear may be used without using white as a supplementary material.

Figure 7:
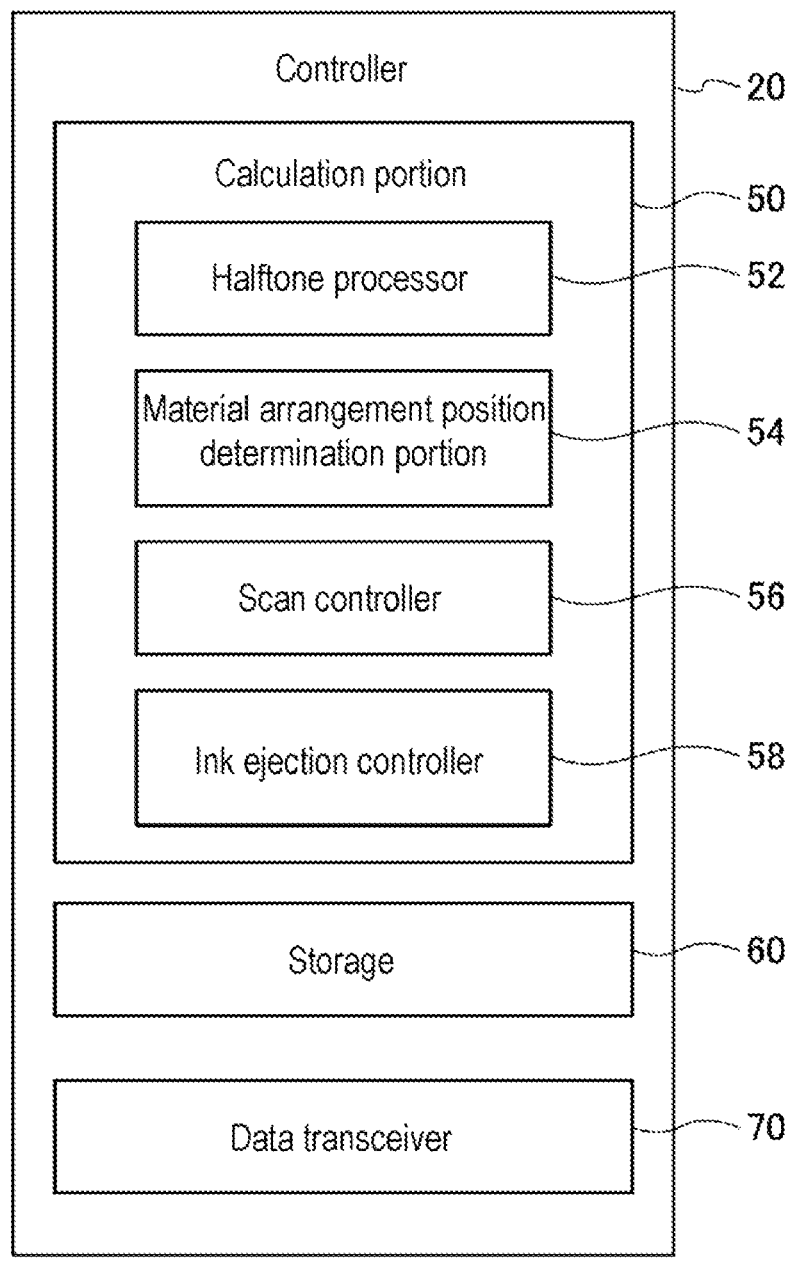
FIG. 7 is a functional block diagram related to shaping processing by the 3D printer according to the first embodiment of the present disclosure.

FIG. 7 is a functional block diagram related to the shaping processing executed by the 3D printer 10 of the embodiment. The controller 20 included in the 3D printer 10 includes a calculation portion 50, a storage 60, and a data transceiver 70.

The calculation portion 50 is a computer such as a central processing unit (CPU), and includes a halftone processor 52, a material arrangement position determination portion 54, a scan controller 56, and an ink ejection controller 58. The functions of the material arrangement position determination portion 54, the scan controller 56, and the ink ejection controller 58 may be implemented by a calculation device executing a program stored in the storage 60. The present disclosure is not limited to this, and individual hardware such as an application specific integrated circuit (ASIC) included in the calculation portion 50 may be provided, and a part or all of the functions may be realized by the hardware.

The halftone processor 52 performs the halftone process on color image data (slice data) received from another information processing apparatus.

The material arrangement position determination portion 54 determines the arrangement positions of the light reflective material W and the coloring material Cd based on the color image data subjected to the halftone process, and generates the ink ejection data. As described above, the material arrangement position determination portion 54 of the present embodiment generates the ink ejection data by determining the arrangement positions of the light reflective material W and the coloring material Cd so that the light reflective material W is arranged at a predetermined position in each unit volume 42 in the region to be colored inside the shaped object 22 and the coloring material Cd is arranged around the light reflective material W based on the color image data. The method of determining the arrangement positions of the light reflective material W and the coloring material Cd by the material arrangement position determination portion 54 is the method described with reference to FIGS. 3 to 6.

The scan controller 56 controls the driving of the scanning driving portion 14 and the layering direction moving portion 18 so that the recording unit 12 moves in the main scanning direction (Y direction) and the sub scanning direction (X direction) and the shaping table 16 moves in the vertical direction (Z direction) based on the ink ejection data and the like generated by the material arrangement position determination portion 54.

The ink ejection controller 58 controls the inkjet head 30 to eject ink droplets based on the ink ejection data and the like.

The storage 60 is a storage medium that stores slice data transmitted from another information processing apparatus or the like, various programs executed by the controller 20, and the like. Note that the storage 60 is, for example, a semiconductor storage device, but is not limited to this.

The data transceiver 70 transmits and receives various types of data to and from another information processing apparatus or the like through wired communication or wireless communication.

Figure 8:
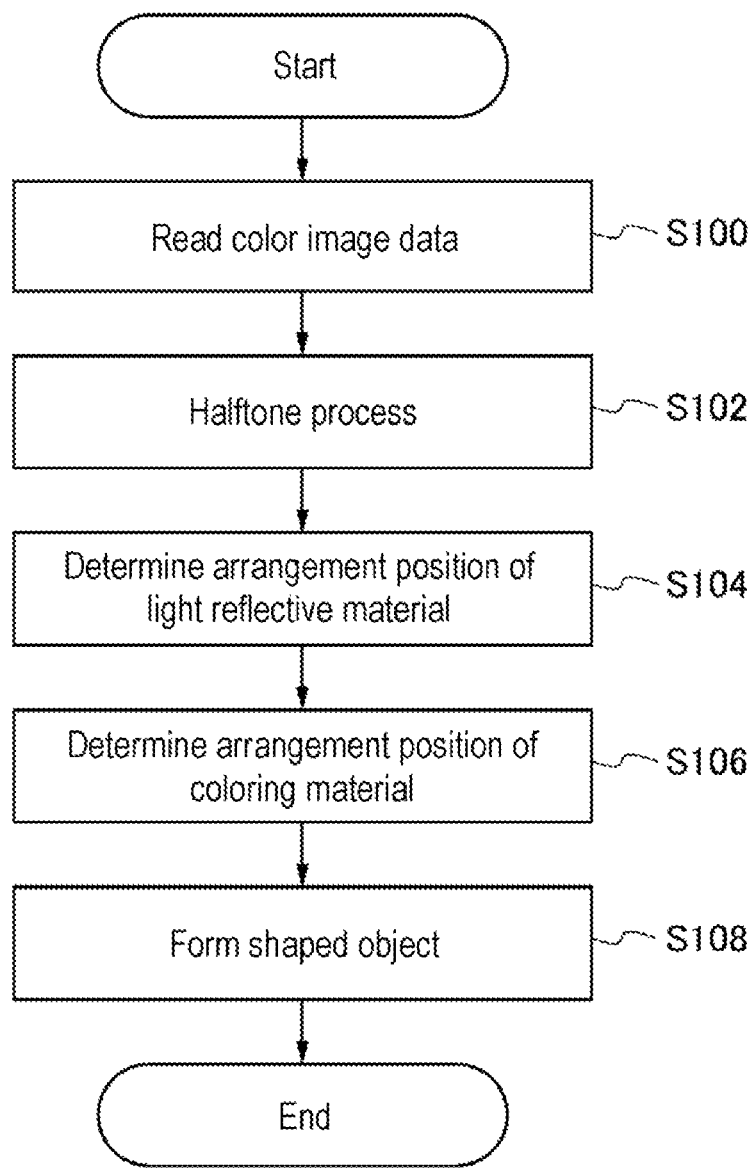
FIG. 8 is a flowchart illustrating a flow of the shaping processing according to the first embodiment of the present disclosure.

FIG. 8 is a flowchart illustrating a flow of the shaping processing of the present embodiment, which is executed when slice data is transmitted from another information processing apparatus.

First of all, in step S100, the halftone processor 52 reads color image data that is slice data temporarily stored in the storage 60.

In the next step S102, the halftone processor 52 performs the halftone process on the color image data.

In the next step S104, the material arrangement position determination portion 54 determines the arrangement position of the light reflective material W for each unit volume 42.

In the next step S106, the material arrangement position determination portion 54 determines the arrangement position of the coloring material Cd so that the coloring material Cd is arranged around the light reflective material W in the region to be colored inside the shaped object 22 based on the color image data subjected to the halftone process, and generates the ink ejection data.

In the next step S108, the scan controller 56 and the ink ejection controller 58 controls the recording unit 12 to eject ink while performing a scanning operation ink based on the ink ejection data, to form the shaped object 22.

In the shaping processing illustrated in FIG. 8, the arrangement position of the light reflective material W is first determined and the arrangement position of the coloring material Cd is then determined, but the present disclosure is not limited to this, and the arrangement position of the coloring material Cd may be first determined irrespective of the arrangement position of the light reflective material W and then the arrangement position of the light reflective material W may be determined. Specifically, the arrangement position of the coloring material Cd is determined, and then data on the coloring material Cd in the voxel 40 overlapping with the light reflective material W is replaced with data on the light reflective material W.

Second Embodiment

Hereinafter, a second embodiment of the present disclosure will be described. Note that the configuration of a 3D printer 10 according to the present embodiment is similar to the configuration of the 3D printer 10 according to the first embodiment illustrated in FIG. 1.

The present embodiment does not involve the concept of the unit volume 42 as described in the first embodiment, and the material arrangement position determination portion 54 determines the arrangement positions of the coloring materials Cd as a unit of voxel which is the minimum constituent unit of the shaped object 22 based on the color image data, in the region to be colored inside the shaped object 22. In addition, the material arrangement position determination portion 54 determines the arrangement positions of the light reflective materials W so that the light reflective materials W are dispersedly arranged in the region to be colored. Note that the region to be colored includes the light reflective material W of the present embodiment at a predetermined ratio with the light reflective material W irregularly dispersed.

Figure 9:
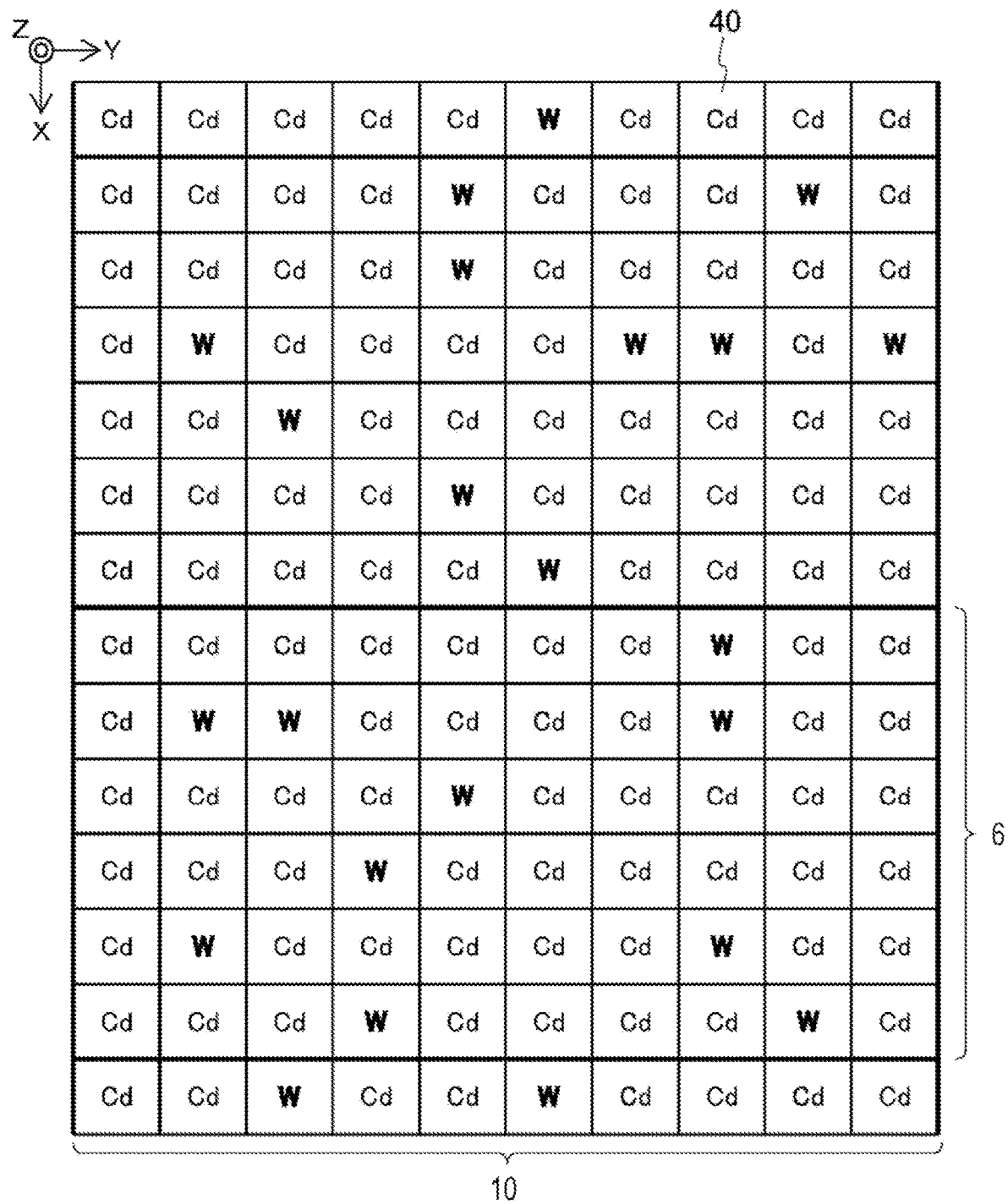
FIG. 9 is a schematic view illustrating arrangement positions of a light reflective material and a coloring material according to a second embodiment of the present disclosure.

FIG. 9 is a schematic view illustrating arrangement positions of the light reflective material W and the coloring materials Cd of the present embodiment. As illustrated in FIG. 9, the light reflective materials W at a predetermined ratio relative to a predetermined number of voxels 40 are arranged to be irregularly dispersed at least in the X direction and the Y direction. In the example of FIG. 9, 10 light reflective materials W are arranged for 60 (6 voxels in the X direction×10 voxels in the Y direction) voxels 40. That is, the light reflective materials W at a microscopic ratio of 17% relative to the coloring materials Cd, are arranged in a dispersed manner. Note that the light reflective materials W may be arranged in a dispersed manner in the Z direction.

Figure 10:
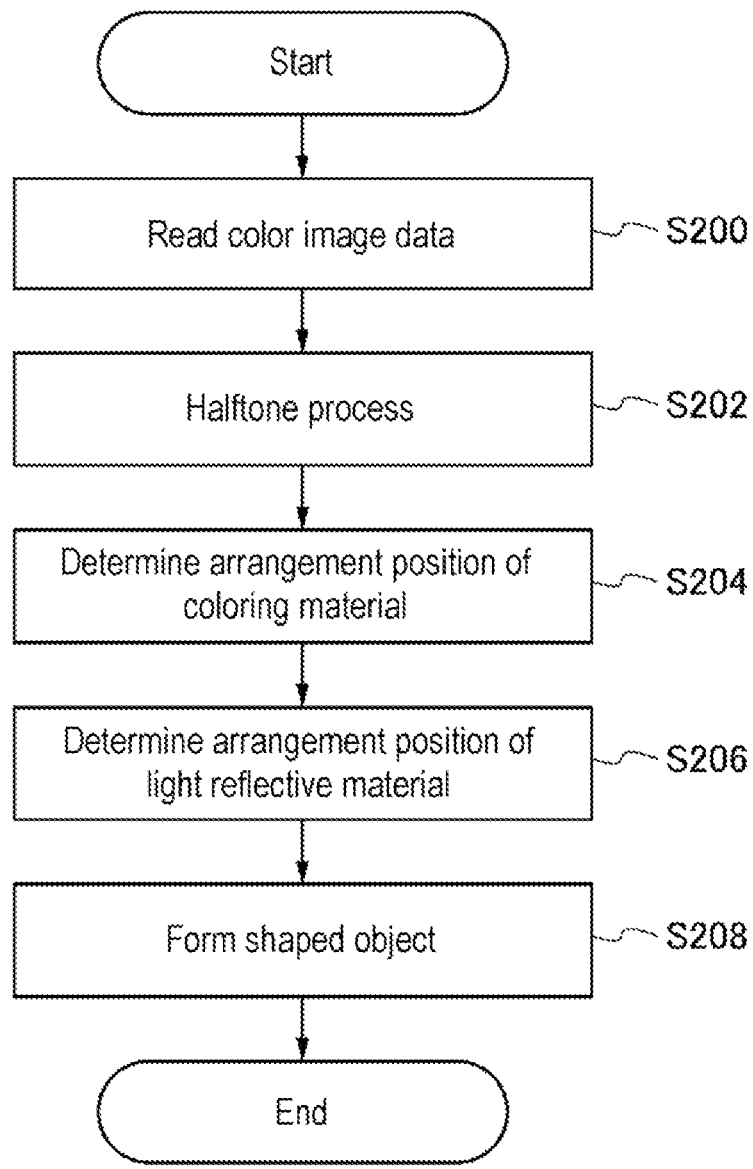
FIG. 10 is a flowchart illustrating a flow of shaping processing according to the second embodiment of the present disclosure.

FIG. 10 is a flowchart illustrating a flow of the shaping processing of the present embodiment, which is executed when slice data is transmitted from another information processing apparatus.

First of all, in step S200, the halftone processor 52 reads color image data that is slice data temporarily stored in the storage 60.

In the next step S202, the halftone processor 52 performs the halftone process on the color image data.

In the next step S204, the material arrangement position determination portion 54 determines the arrangement positions of the coloring materials Cd as a unit of voxel in the region to be colored inside the shaped object 22 based on the color image data subjected to the halftone process. In step S204, the arrangement positions of the coloring materials Cd may be determined for the voxels 40 over the entirety of the region to be colored, without taking into consideration the arrangement positions of the light reflective materials W determined in the next step. In such a case, the arrangement of the light reflective materials W needs to be prioritized in the next step S206.

In the next step S206, the material arrangement position determination portion 54 determines the arrangement positions of the light reflective materials W and uses the determined arrangement positions as ink ejection data. The arrangement positions of the light reflective materials W are randomly determined such that the region to be colored includes the light reflective materials W at a predetermined ratio, and the data on the coloring materials Cd at the determined positions are replaced with the data on the light reflective materials W.

In the next step S208, the scan controller 56 and the ink ejection controller 58 controls the recording unit 12 to eject ink while performing a scanning operation ink based on the ink ejection data, to form the shaped object 22.

As described above, the 3D printer 10 of the present embodiment determines the arrangement positions of the coloring materials Cd in the interior of the shaped object 22 as a unit of voxel of the shaped object 22. Thus, the color of the shaped object 22 based on the color image data can be more smoothly expressed. Furthermore, the light reflective materials W at a predetermined ratio in the region to be colored are arranged while being irregularly dispersed, whereby the color of the light reflective material W is prevented from strongly appearing on the cut surface 22A of the shaped object 22. Therefore, with the 3D printer 10 of the present embodiment, the interior of the shaped object 22 can be formed with excellent color expression.

Third Embodiment

Hereinafter, a third embodiment of the present disclosure will be described. In the present embodiment, the arrangement of the material in the vicinity of the surface of the shaped object 22 formed by the 3D printer 10 will be described.

Figure 11:
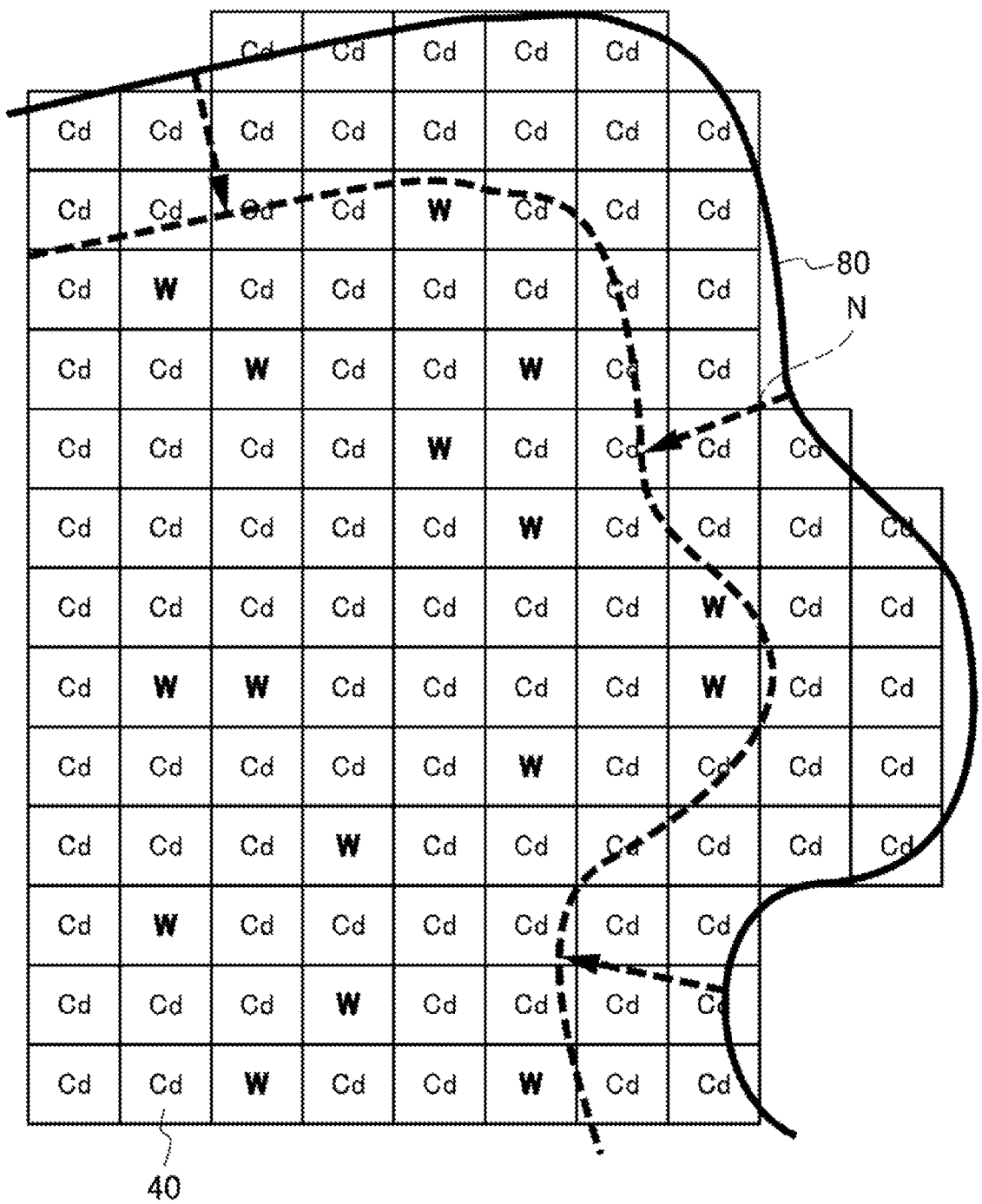
FIG. 11 is a schematic view illustrating arrangement positions of the light reflective material and the coloring material in the vicinity of the surface of the shaped object according to a third embodiment of the present disclosure.

FIG. 11 is a schematic view illustrating arrangement positions of the light reflective material W and the coloring material Cd in the vicinity of the surface of the shaped object 22 of the present embodiment.

As illustrated in FIG. 11, a region corresponding to a predetermined thickness in a normal direction N from the surface toward the inside of the shaped object 22 is set to be a no light reflective material arranged region 80 in which no light reflective material W is arranged. Then, the material arrangement position determination portion 54 arranges the coloring materials Cd in the no light reflective material arranged region 80 based on the color image data. Note that, in FIG. 11, the predetermined thickness is set to be a thickness corresponding to two voxels 40, but this is an example, and the thickness may be three voxels 40 or more, or may be one voxel 40. With the predetermined thickness thus set to be two voxels 40 or more, the color of the surface of the shaped object 22 can be expressed with a secondary color obtained with YMC.

With only the coloring materials Cd arranged in the no light reflective material arranged region 80, the color of the light reflective material W would not appear on the surface of the shaped object 22, whereby the color expression with excellent contrast can be achieved on the surface of the shaped object 22.

Figure 12:
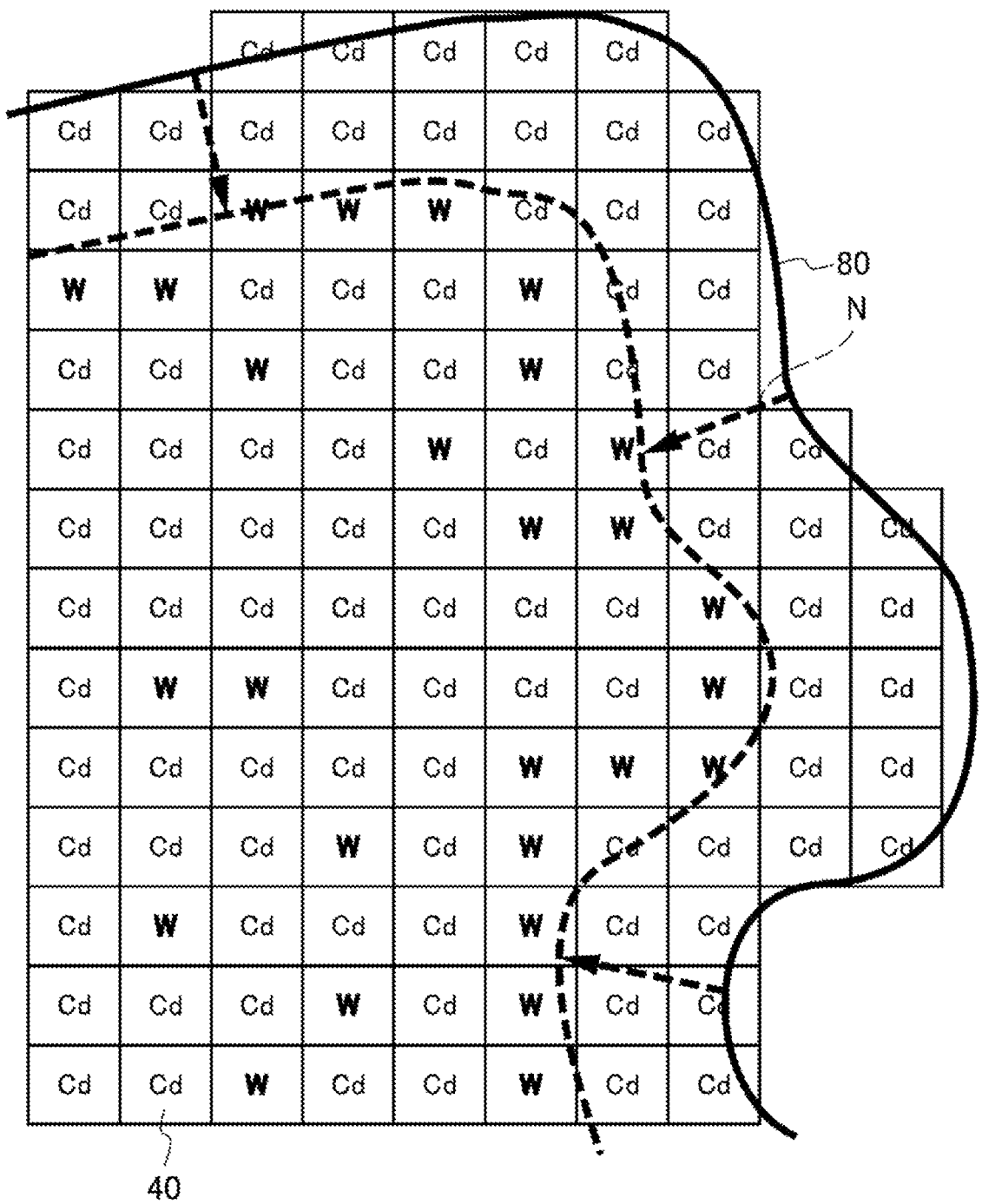
FIG. 12 is a schematic view illustrating arrangement positions of the light reflective material and the coloring material in the vicinity of the surface of the shaped object according to the third embodiment of the present disclosure.

FIG. 12 is a schematic view illustrating another example of arrangement positions of the light reflective material W and the coloring material Cd in the vicinity of the surface of the shaped object 22 of the present embodiment. As illustrated in FIG. 12, a material arrangement position determination device 62 may arrange a relatively large amount of the light reflective materials W with respect to an inner region of the shaped object 22 in contact with the no light reflective material arranged region 80. Thus, color expression with excellent contrast with respect to the surface of the shaped object 22 can be achieved.

In the example of FIG. 12, the light reflective materials W are arranged in voxels 40 on or adjacent to the border of the no light reflective material arranged region 80, but this is an example, and the light reflective material W may be separated from the boundary by more than one voxel 40.

Although the present disclosure has been described with reference to the above embodiments, the technical scope of the present disclosure is not limited to the scope described in the above embodiments. Various changes or improvements can be made to each of the above embodiments without departing from the gist of the disclosure, and a mode in which the changes or improvements are made is also included in the technical scope of the present disclosure. In addition, the above-described embodiments may be appropriately combined.

FIG. 13 is a schematic diagram illustrating an implementation pattern regarding the arrangement of the light reflective material W and the coloring material Cd. The description "unit volume" in FIG. 13 indicates that the arrangement position of the light reflective material W or the coloring material Cd is determined for each unit volume 42. Furthermore, the description "voxel" in FIG. 13 indicates that the arrangement position of the light reflective material W or the coloring material Cd is determined as a unit of voxel.

Implementation pattern 1 and Implementation pattern 2 are patterns where the light reflective material W is arranged for each unit volume 42. With Implementation pattern 1, the arrangement position of the coloring material Cd is limited by the unit volume 42, whereas with Implementation pattern 2, the arrangement position of the coloring material Cd is determined in the unity of voxel, and thus is not limited by the unit volume 42.

Implementation pattern 4 and Implementation pattern 2 are patterns in which the arrangement position of the coloring material Cd is determined as a unit of voxel. As an example, the arrangement position of the coloring material Cd is first determined, and then the arrangement position of the light reflective material W is determined. Note that with Implementation pattern 4, the arrangement position of the light reflective material W is determined as a unit of voxel. Thus, Implementation pattern 4 involves no concept of the unit volume 42.

With Implementation pattern 3, the light reflective material W is determined as a unit of voxel, and the arrangement position of the coloring material Cd is determined for each unit volume 42. Thus, the arrangement position of the coloring material Cd is limited by the unit volume 42, but the arrangement position of the light reflective material W is not limited by the unit volume 42.

Note that Implementation patterns 1 and 2 correspond to the first embodiment, and the Implementation pattern 4 corresponds to the second embodiment.

Furthermore, in the present embodiment, the mode of ejecting the color ink of YMCK color has been described, but the present disclosure is not limited to this. A flame color of YMCK color, color inks of red (R), green (G), and blue (B), a metallic (silver color) ink, and the like may also be ejected.

Effects of Embodiment

The 3D printer 10 according to the present embodiment is a shaping apparatus that forms the three-dimensional shaped object 22 having an interior colored, with layer bodies of the light reflective material W and the coloring material Cd ejected from the inkjet head 30 layered, and includes the material arrangement position determination device 62 that determines an arrangement position of the light reflective material W and an arrangement position of the coloring material Cd to arrange the light reflective material W at predetermined position in each unit volume 42 and to arrange the coloring material Cd around the light reflective material W based on the color image data, in a region to be colored in the shaped object 22, wherein a set position of the unit volume 42 is set to make one surface of each unit volume 42 in contact with a plurality of other unit volumes 42. Thus, since the light reflective materials W is dispersedly arranged instead of being positioned in a concentrated manner, the color of the light reflective material W can be prevented from strongly appearing on the cut surface 22A of the shaped object 22. Therefore, with the present embodiment, the interior of the shaped object 22 can be formed with excellent color expression.

(2) The material arrangement position determination device 62 of the present embodiment arranges the coloring material Cd based on the color image data irrespective of the setting position of the unit volume 42 or the arrangement position of the light reflective material W in the region to be colored inside the shaped object 22. With the present embodiment, the arrangement position of the coloring material Cd is not limited by the unit volume 42, whereby the color of the shaped object 22 based on the color image data can be more smoothly expressed.

(3) The 3D printer 10 of the present embodiment is a shaping apparatus that forms the three-dimensional shaped object 22 having an interior colored, with layer bodies of the light reflective material W and the coloring material Cd ejected from the inkjet head 30 layered, and includes: the material arrangement position determination device 62 that determines an arrangement position of the coloring material Cd, in a region to be colored in the shaped object 22, as a unit of voxel of the shaped objected 22 based on the color image data, and determines an arrangement position of the light reflective material W to arrange the light reflective material W in a dispersed manner in the region to be colored. Thus, the color of the shaped object 22 based on the color image data can be more smoothly expressed. Furthermore, the light reflective material W is dispersedly arranged in the region to be colored, whereby the color of the light reflective material W is prevented from strongly appearing on the cut surface 22A of the shaped object 22. Therefore, with the present embodiment, the interior of the shaped object 22 can be formed with excellent color expression.

(4) The region to be colored in the shaped object 22 includes the light reflective material W of the present embodiment at a predetermined ratio with the light reflective material W irregularly dispersed. With the present embodiment, the color of the light reflective material W can be prevented from strongly appearing on the cut surface 22A of the shaped object 22.

(5) When a color in the shaped object 22 indicated by the color image data is a color with a higher brightness or a lower saturation than a peripheral color, the 3D printer 10 of the present embodiment arranges a transparent material in an arranged region of the coloring material Cd. With the present embodiment, a bright color or a light color can be expressed while maintaining the color tone, and the shape of the shaped object 22 can be maintained.

(6) With the 3D printer 10 of the present embodiment, a region of a predetermined thickness in a normal direction from a surface toward the interior of the shaped object 22 is set to be the no light reflective material arranged region 80 in which the light reflective material W is not arranged, and the material arrangement position determination device 62 arranges the coloring material Cd in the no light reflective material arranged region 80 based on the color image data. With the present embodiment, the color of the light reflective material W does not appear on the surface of the shaped object 22, whereby color expression with excellent contrast with respect to the surface of the shaped object 22 can be achieved.

(7) The material arrangement position determination device 62 of the present embodiment arranges a relatively large amount of the light reflective materials W with respect to an inner region of the shaped object 22 in contact with the no light reflective material arranged region 80. With the present embodiment, color expression with excellent contrast with respect to the surface of the shaped object 22 can be achieved.

What is claimed is:

1. A shaping apparatus that forms a shaped object which is three-dimensional and has an interior being colored, with layer bodies of a light reflective material and a coloring material ejected from an ejection head based on color image data layered, the shaping apparatus comprising:
- a determination device, configured to determine an arrangement position of the light reflective material and an arrangement position of the coloring material to arrange the light reflective material at a predetermined position in each unit volume and to arrange the coloring material around the light reflective material based on the color image data, in a region to be colored in the shaped object,
- wherein a set position of the unit volume is set to make one surface of each unit volume in contact with a plurality of other unit volumes.

2. The shaping apparatus according to claim 1, wherein the determination device is configured to arrange the coloring material in the region to be colored based on the color image data, irrespective of the set position of the unit volume or the arrangement position of the light reflective material.

3. A shaping apparatus that fauns a shaped object which is three-dimensional and has an interior being colored, with layer bodies of a light reflective material and a coloring material ejected from an ejection head based on color image data layered, the shaping apparatus comprising:
- a detem ination device, configured to:
  - determine an arrangement position of the coloring material, in a region to be colored in the shaped object, in a minimum constituent unit of the shaped objected based on the color image data, and
  - determine an arrangement position of the light reflective material to arrange the light reflective material in a dispersed manner in the region to be colored.

4. The shaping apparatus according to claim 3, wherein the region to be colored includes the light reflective material at a predetermined ratio, and
the light reflective material is arranged irregularly and in the dispersed manner.

5. The shaping apparatus according to claim 1, wherein when a color in the shaped object indicated by the color image data is a color with a higher brightness or a lower saturation than a peripheral color, a transparent material is arranged in an arranged region of the coloring material.

6. The shaping apparatus according to claim 1, wherein a region of a predetermined thickness in a nomial direction from a surface toward the interior of the shaped object is set to be a no light reflective material arranged region in which the light reflective material is not arranged, and
the determination device is configured to arrange the coloring material in the no light reflective material arranged region based on the color image data.

7. The shaping apparatus according to claim 6, wherein the determination device is configured to arrange a relatively large amount of the light reflective material in an inner region of the shaped object in contact with the no light reflective material arranged region.

8. The shaping apparatus according to claim 1, wherein a color of the light reflective material is white.

9. The shaping apparatus according to claim 1, wherein the arrangement position of the coloring material is deteituined with a halftone process perfoiined on the color image data.

10. The shaping apparatus according to claim 1, wherein a color of the coloring material at least includes yellow, magenta, and cyan, and
the shaped object is colored by a subtractive color mixing method.

11. The shaping apparatus according to claim 1, wherein the light reflective material and the coloring material are ultraviolet-curable resin.

12. A shaping apparatus that forms a shaped object which is three-dimensional and has an interior being colored, with layer bodies of a light reflective material and a coloring material ejected from an ejection head based on color image data layered, the shaping apparatus comprising:
- a determination device, configured to determine an arrangement position of the light reflective material and an arrangement position of the coloring material to arrange the light reflective material at a predetermined position in each unit volume and to arrange the coloring material around the light reflective material based on the color image data, in a region to be colored in the shaped object,
- wherein the determination device is configured to arrange the coloring material in the region to be colored, irrespective of the set position of the unit volume or the arrangement position of the light reflective material.

* * * * *